(12) United States Patent
Stroik, Jr.

(10) Patent No.: US 10,112,576 B2
(45) Date of Patent: Oct. 30, 2018

(54) SEATBELT RETRACTOR

(71) Applicant: TK HOLDINGS INC., Auburn Hills, MI (US)

(72) Inventor: Gary Lee Stroik, Jr., Swartz Creek, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 1160 days.

(21) Appl. No.: 13/679,466

(22) Filed: Nov. 16, 2012

(65) Prior Publication Data

US 2013/0126657 A1     May 23, 2013

Related U.S. Application Data

(60) Provisional application No. 61/561,564, filed on Nov. 18, 2011.

(51) Int. Cl.
    *B60R 22/34*     (2006.01)
    *B60R 22/28*     (2006.01)

(52) U.S. Cl.
    CPC .... *B60R 22/3413* (2013.01); *B60R 2022/289* (2013.01)

(58) Field of Classification Search
    USPC ..... 242/379.1, 381, 396.5–396.6, 396.9, 423
    See application file for complete search history.

(56) References Cited

U.S. PATENT DOCUMENTS

| | | | |
|---|---|---|---|
| 5,823,570 A | 10/1998 | Lane et al. | |
| 6,260,782 B1 | 7/2001 | Smithson et al. | |
| 6,669,133 B2 | 12/2003 | Palliser et al. | |
| 2004/0206844 A1* | 10/2004 | Shiotani et al. | 242/379.1 |
| 2006/0131456 A1 | 6/2006 | Romero | |
| 2010/0011692 A1 | 1/2010 | Lucey et al. | |
| 2010/0116921 A1 | 5/2010 | Gray | |
| 2010/0301151 A1* | 12/2010 | Heitkamp | 242/379.1 |

FOREIGN PATENT DOCUMENTS

| | | |
|---|---|---|
| EP | 1 024 064 B1 | 6/2003 |
| JP | 2004-249968 | 9/2004 |
| JP | 2006-063049 A | 3/2006 |

OTHER PUBLICATIONS http://www.merriam-webster.com/dictionary/pinch.*
https://dossier1.j-platpat.inpit.go.jp/cgi-bin/tran_web_cgi_ejje?u=
http://dossier1.j-platpat.inpit.go.jp/tri/translation/
201607270143378962250808878446603A22D70DE018FBFEF53B59-
E591B78697A&tt1=patent&tt2=internet&tt3=computerV16&tt4=
chemistryV16&tt5=machineV16&tt6=proper&tt7=architectV16&tt8=
logisticsV16&tt9=electronicsV16&tt10=biologyV16&tt11=
physica.*
International Preliminary Report on Patentability dated May 20, 2014 issued in connection with International Application No. PCT/US2012/065602.
Written Opinion of the International Searching Authority PCT/US2012/065602 dated Mar. 29, 2013.

* cited by examiner

*Primary Examiner* — Sang K Kim
(74) *Attorney, Agent, or Firm* — Gordon Rees Scully Mansukhani, LLP

(57) ABSTRACT

A retractor assembly for a seatbelt system having a webbing for restraining a secured occupant, the retractor comprising a spool configured to wind and unwind the webbing about an axis of rotation, the spool includes a side with an opening therein; a collar including an outer surface and an inner surface, the outer surface configured to engage the opening; a locking base configured to operatively engage the inner surface; and an energy absorbing member configured to provide a progressive level of load resistance upon relative rotation between the spool and the locking base.

19 Claims, 9 Drawing Sheets

SEATBELT RETRACTOR

CROSS-REFERENCE TO RELATED PATENT APPLICATIONS

This application claims the benefit of and priority to U.S. Provisional Patent Application No. 61/561,564, which was filed on Nov. 18, 2011. U.S. Provisional Patent Application No. 61/561,564 is incorporated by reference herein in its entirety.

BACKGROUND

The present application relates generally to the field of occupant restraint devices (e.g., seatbelt assemblies) having energy management (e.g., load absorbing) capabilities. More specifically, the present application relates to an improved method of managing energy for use in a seatbelt retractor of an occupant restraint device.

SUMMARY

One embodiment relates to a retractor assembly for a seatbelt system having a webbing for restraining a secured occupant. The retractor comprises a spool, a collar, a locking base, and an energy absorbing member. The spool is configured to wind and unwind the webbing about an axis of rotation, and the spool includes a side with an opening therein. The collar includes an outer surface and an inner surface, where the outer surface is configured to engage the opening of the spool. The locking base is configured to operatively engage the inner surface of the collar. The energy absorbing member is configured to provide a progressive level of load resistance upon relative rotation between the spool and the locking base.

The energy absorbing member may be disposed between the locking base and the spool and may be configured to provide the progressive level of load resistance upon compression, such as where the relative rotation between the spool and the locking base drives movement of the locking base relative to the spool in a direction parallel to the axis of rotation to compress the energy absorbing member. Alternatively, the retractor assembly may further comprise a shaft disposed in the opening of the spool and an opening in the locking base, where the energy absorbing member is disposed around the shaft in the opening of the spool and the opening in the locking base. The energy absorbing member may include a first end connected to the spool and a second end connected to the locking base, such that relative rotation between the spool and the locking base winds the energy absorbing member to provide the progressive level of load resistance.

Another embodiment relates to a retractor assembly for a seatbelt system having a webbing for restraining a secured occupant. The retractor comprises a spool, an energy absorbing member, a movable member, and a locking base. The spool is configured to wind and unwind the webbing about an axis of rotation, and the spool includes a side with an opening therein. The energy absorbing member is disposed in the opening of the spool and is configured to provide a progressive level of load resistance upon compression. The movable member is disposed in the opening of the spool. Relative rotation between the spool and the locking base is configured to move the movable member to compress the energy absorbing member.

Yet another embodiment relates to a retractor assembly for a seatbelt system having a webbing for restraining a secured occupant. The retractor comprises a spool, a locking base, a shaft, and an energy absorbing member. The spool is configured to wind and unwind the webbing about an axis of rotation, and the spool includes a bore provided in a side. The locking base is provided on the side of the spool. The shaft is disposed in the bore and includes an end coupled to one of the spool and the locking base. The shaft also including at least one arm. The energy absorbing member is in the form of a coil spring that is disposed in the bore around the shaft, such that the at least one arm is provided between two adjacent coils of the coil spring. The coil spring is configured to provide a progressive level of load resistance upon relative rotation between the spool and the locking base.

DETAILED DESCRIPTION

With general reference to the Figures, disclosed herein are retractor mechanisms (e.g., retractors) that are configured to include energy management or absorbing devices configured to absorb energy and load in a non-uniform (e.g., progressive) manner, such as by starting off with a relative lower level of energy absorption (e.g., load resistance), then as the occupant that is secured by the webbing displaces (e.g., deflects) the retractor increases the level of load and energy absorption (e.g., load resistance). The occupant restraint systems having retractors with energy management devices (e.g., load absorbing members), as disclosed herein, are configured to limit the chest deflection (or displacement) and compression of the occupant. By initially providing a relative low level of energy absorption, the retractors, as disclosed herein, may advantageously provide improved performance for small occupants (e.g., fifth percentile occupants). Also, by providing a progressive level of load and energy absorption, the retractors, as disclosed herein, are able to restrain larger occupants (e.g., ninety-fifth percentile occupants) to limit their deflection, since the relative lower level of energy absorption ideal for smaller occupants may not be ideal to limit the deflection of the larger occupants during vehicle dynamic events. In other words, the retractors, as disclosed herein, may advantageously provide an efficient method for limiting the deflection of occupants that range in size (e.g., from small to large occupants) to provide favorable performance in view of the New Car Assessment Program (NCAP) criteria, such as by employing an energy management system that provides a progressive manner of load and energy absorption during dynamic vehicle events.

Occupant restraint devices, such as seatbelt assemblies, include seatbelt retractors (e.g., retractors) that generally include torsion bars configured to absorb energy during loading of the seatbelt assembly by an occupant, such as during a dynamic vehicle event (e.g., front-impact). The retractor includes a spool that is coupled to an end of the seatbelt webbing and a locking element (e.g., locking base) that selectively prevents rotation of the spool relative to the locking element and/or the frame (e.g., base) of the retractor, except for rotation of the spool that overcomes the torsion strength of the torsion bar. Thus, the torsion bar absorbs energy by allowing the selectively locked spool to rotate when the loading through the spool is greater than a threshold torsion strength of the torsion bar.

Figure 1:
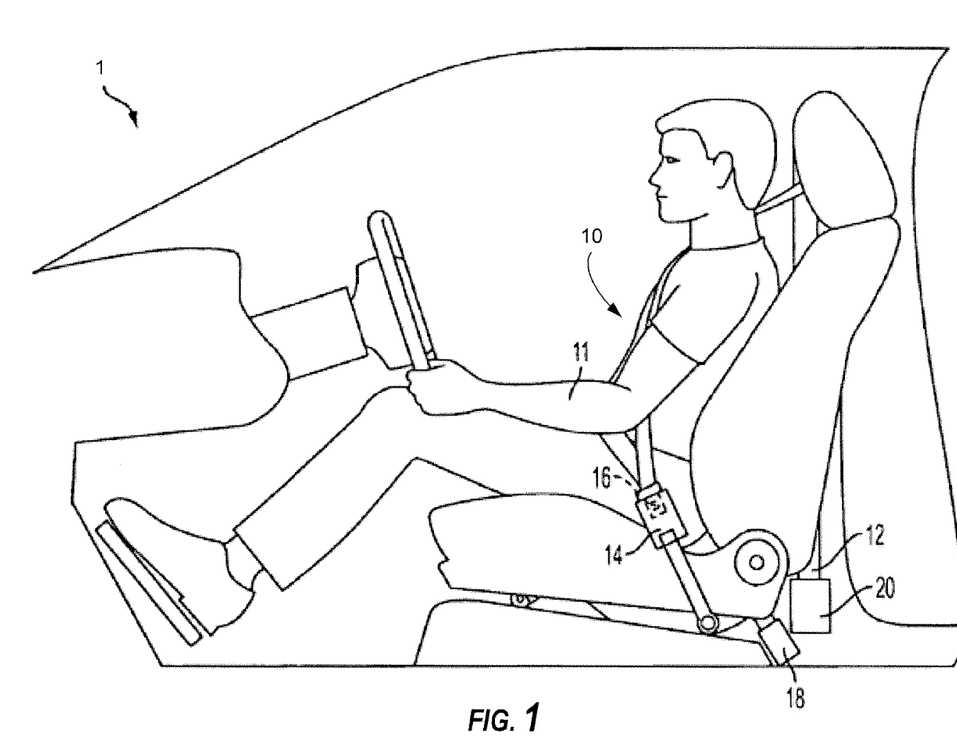
FIG. 1 is a side view of a vehicle showing an occupant restraint system in the form of a seatbelt assembly having a retractor according to an exemplary embodiment.

FIG. 1 illustrates an active occupant restraint system in the form of a seatbelt system 10. The seatbelt system 10 is used in a vehicle 1 to restrain the movement of the secured occupant 11 during a sudden positive or negative acceleration (e.g., a deceleration), such as an acceleration induced by a dynamic impact of the vehicle. The seatbelt system 10 includes a seat belt or webbing 12, a buckle mechanism 14, a tongue member 16 configured to selectively engage the buckle mechanism 14, an anchor member 18 configured to fix an end (e.g., a first end) of the webbing 12, and a retractor mechanism 20 (e.g., retractor assembly, retractor, etc.). Another end (e.g., a second end) of the webbing 12 is operatively coupled to the retractor 20, such that the webbing 12 is able to wind (e.g., retract) and/or unwind (e.g., extract) with respect (e.g., relative) to the retractor 20.

The retractor 20 may, for example, be configured to operate in one of two modes of operation: a first free mode of operation where the webbing 12 is able to freely wind and unwind relative to the retractor 20, such as to allow the occupant 11 to be comfortably secured in the seat by allowing extraction of the webbing to increase the slack between the occupant and the webbing; and a second energy absorbing (or locked) mode of operation where the webbing 12 may be retracted into the retractor, but the extraction of the webbing from the retractor is resisted by one or more than one energy management device (e.g., an energy absorbing member, a load absorbing member, a torsion bar, etc.). Accordingly, during a vehicle dynamic impact event, the retractor 20 may switch from the first mode of operation to the second mode of operation to lock the retractor to thereby prohibit the webbing 12 from extracting or unwinding from the retractor 20 to prohibit deflection of the secured occupant.

The seatbelt system 10 may include one or more sensors (not shown) that detect a sudden acceleration of the vehicle, such as during a vehicle dynamic impact event. The sensor may communicate a signal to a controller (not shown) indicating the severity of the acceleration (e.g., low, high), whereby the controller may determine whether to activate the retractor 20, such as to switch the retractor 20 from the first mode of operation to the second mode of operation.

Figure 2:
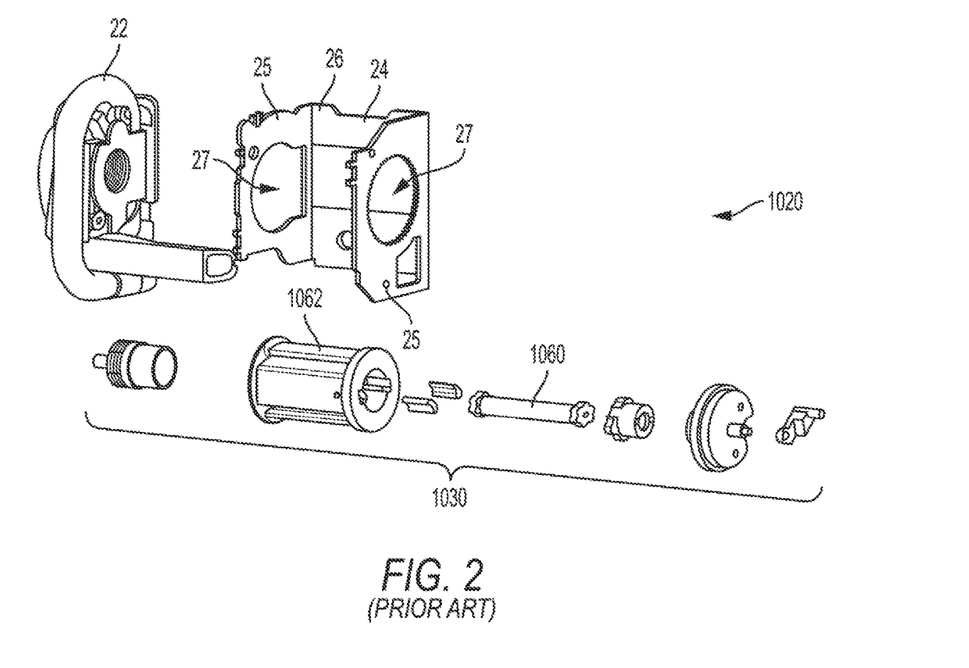
FIG. 2 is an exploded perspective view of a conventional retractor having a torsion bar integrated within the spool.

The retractor 20 may include a pretensioner, such as the pretensioner 22 shown in FIG. 2, to provide non-reversible retraction of the webbing 12 into the retractor 20, upon deployment, such as during a vehicle dynamic impact event. The pretensioner 22 retracts the webbing 12 into the retractor 20 to remove slack (e.g., clearance, looseness) between the occupant 11 and the webbing 12. The pretensioner 22 is non-reversible to prohibit extraction of the webbing 12 from the retractor 20 following retraction of the webbing 12 into the retractor 20.

The retractor 20 includes a frame, such as the frame 24 shown in FIG. 2, that is configured to structurally support the retractor 20 in order to withstand the stresses imparted to the retractor 20 from the webbing 12 induced by occupant loading during a sudden acceleration. The frame 24 may be configured to pivotally support a spool assembly, such as, for example, the spool assemblies shown in FIGS. 4-10. The frame 24 includes two legs 25 that extend from a base 26, where each leg 25 includes an opening or aperture 27 that is configured to receive a portion of the spool assembly.

Figure 3:
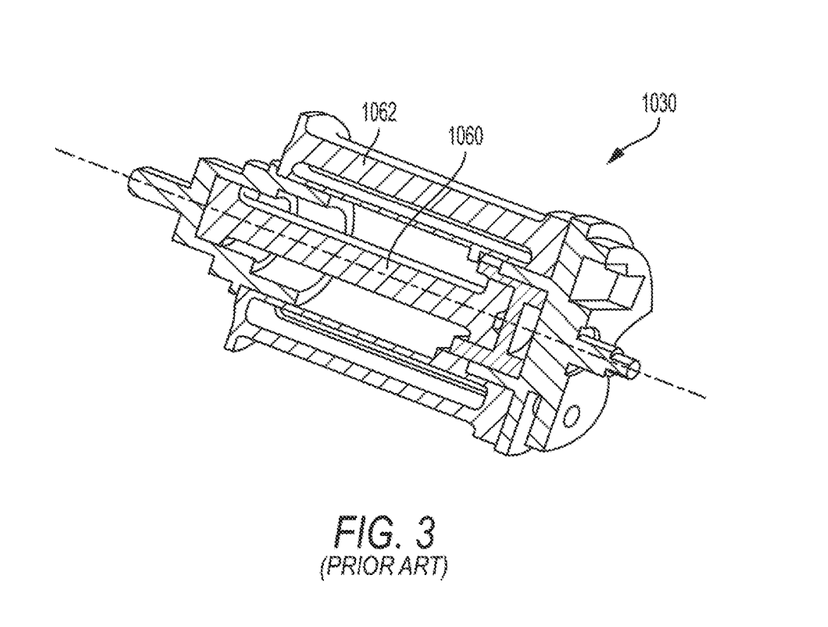
FIG. 3 is a cross-sectional view of the conventional spool of FIG. 2.

As shown in FIGS. 2 and 3, conventional retractors 1020 commonly utilize a torsion bar 1060 disposed within the spool 1062 of the retractor 1020 to provide energy management with the purpose of removing energy from the system during a dynamic vehicle event, such as a front-impact event. The torsion bar 1060 is generally made from steel to provide a constant load throughout their design range. As a result, the load management capability of the conventional retractor 1020 is limited to a single level of energy absorption.

However, the torsion bar is limited in the loading that it is capable of absorbing (i.e., the torque curves the torsion bar produces have limited shapes), which in turn limits the energy absorbing ability of the retractor. For example, a retractor having a torsion bar may have a flat torque curve representing a flat energy absorbing characteristic. Accordingly, there is a desire to be able to tailor (e.g., tune) the energy absorbing characteristics of the retractor to meet varying needs based on parameters, such as the particular vehicle and the seating position of the restrained occupant, in order to tailor the reactive forces that the seatbelt assembly exerts onto the restrained occupant during dynamic vehicle events.

The retractors disclosed herein include energy management devices that allow the retractor to have a tailored energy absorbing characteristic, which may be configured to match a customer's (e.g., OEM's) specific requirements.

Figure 4:
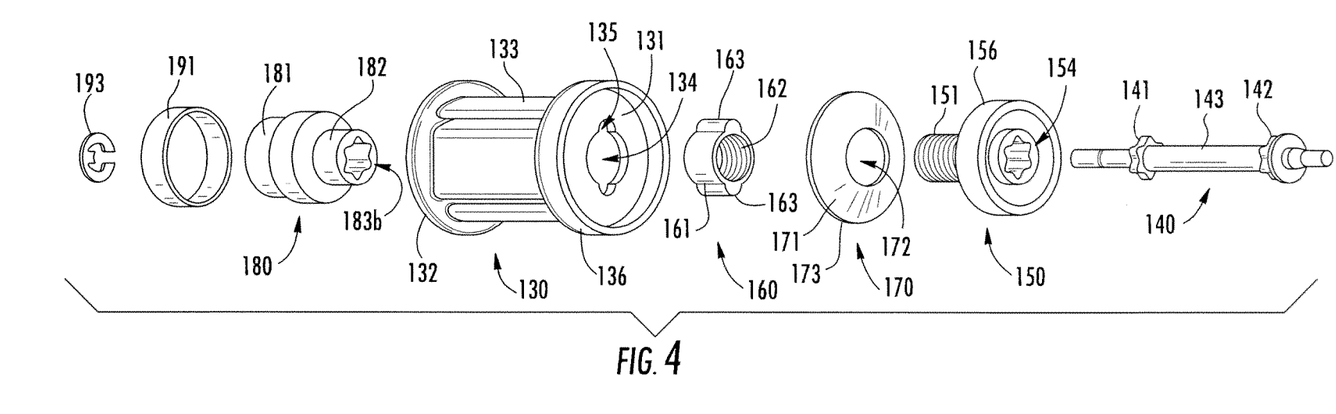
FIG. 4 is an exploded perspective view of a spool assembly for a seatbelt retractor having an energy management device, according to an exemplary embodiment.
Figure 5:
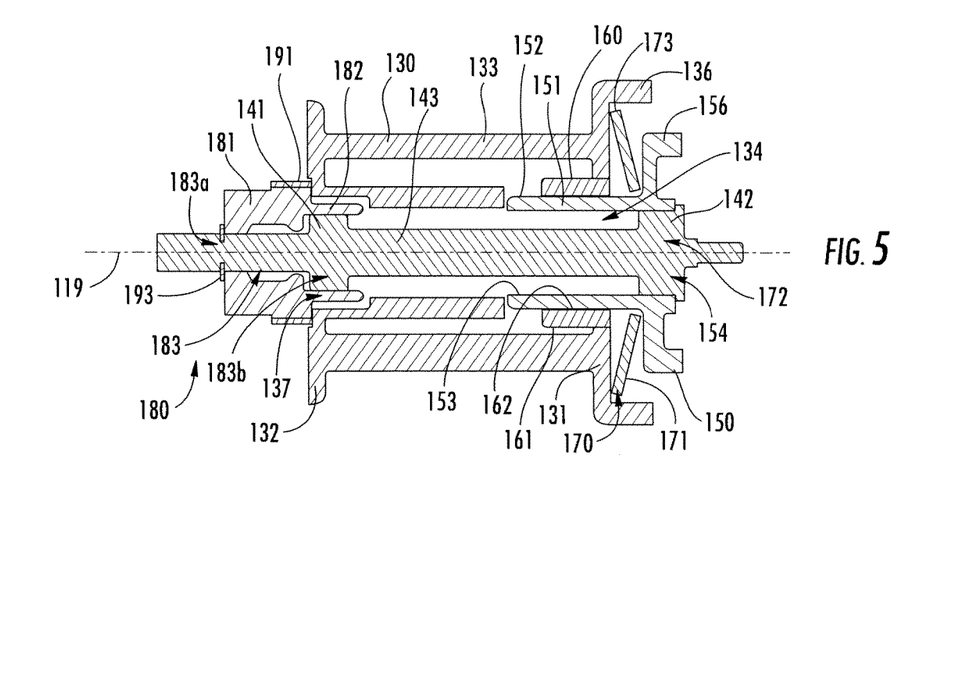
FIG. 5 is a cross-sectional view of the retractor of FIG. 4.

FIGS. 4 and 5 illustrate an exemplary embodiment of a spool assembly for a retractor (e.g., the retractor 20) that includes a spool 130, a torsion bar 140, a locking base 150, a collar 160 provided between the spool 130 and the locking base 150, and an energy management device 170 (e.g., an energy absorbing member, a load carrying member, etc.). The spool 130 is configured to be operatively coupled to an end of the seatbelt webbing 12. The torsion bar 140 is disposed within the spool 130 and configured to absorb energy. The locking base 150 is configured to selectively lock rotation of the retractor.

The spool 130 is configured to rotate about an axis of rotation 119 (e.g., a longitudinal axis, a pivot axis, etc.) and includes a first end 131, a second end 132, and an annular body 133 configured to receive an end of the webbing 12. As shown, the first end 131 is configured to receive the collar 160, the locking base 150, and the torsion bar 140 through an opening 134 therein. The surface of the spool 130 that defines the opening 134 may be configured to support the collar 160. The opening 134 may further include anti-rotation features that are configured to prevent relative rotation between the spool 130 and the collar 160. For example, the opening 134 may include one or more semi-circular (or other suitably shaped) portions 135 to receive a mating portion (e.g., a lug) of the collar 160 therein, as shown in FIG. 4. The first end 131 may also include a shoulder 136 that extends away from the annular body 133, such as in a direction parallel to the axis of rotation 119, where the shoulder 136 may be configured to capture the energy management device 170 in a cavity formed by, for example, the shoulder 136 and first end 131 in combination with the locking base 150. The second end 132 may be configured to pivotally engage the frame 24 (e.g., the aperture 27), or the retractor 20 may include another component (e.g., a pinion) that is coupled to the second end 132 and may pivotally engage the frame 24.

As shown, the collar 160 is in the form of an annular member having a outer surface 161 defined by an outer diameter and an inner surface 162 that is defined by an inner diameter. The inner surface 162 may be threaded to couple to the locking base through a threaded connection. The threaded connection may allow for relative movement between the collar 160 and the locking base 150 along the axis of rotation 119. The outer surface 161 may be configured to be supported by the spool 130, and may include anti-rotation features to prevent relative rotation between the collar 160 and the spool 130. For example, the collar 160 may include one or more lugs 163 that extend from the outer surface 161, where each lug 163 is configured to engage a mating portion 135 of the opening 134. As shown in FIG. 4, the collar 160 includes two lugs 163 provided on opposing sides of the collar 160. However, the collar 160 may include any number of lugs, which may have any angular spacing around the outer surface 161.

The collar 160 may have other suitable configurations to prevent relative rotation between the spool 130 and the collar 160 while allowing for relative movement (e.g., axial movement) between the collar 160 and the locking base 150. For example, the collar may be in the form of a nut having a polygonal shaped outer surface (e.g., hexagonal outer surface) that is configured to engage a mating polygonal shaped opening 134 (e.g., hexagonal opening) in the first side of the spool 130. The nut may have a generally annular central opening that includes a threaded inner surface. Also, for example, the collar may have an outer surface that has a key-way shape (e.g., spline, star, polygon, etc.), which is configured to engage a mating key-way shaped opening in the spool 130.

The locking base 150 is configured to operatively engage the collar 160 and to retain the energy management device 170 provided between the spool 130 and the locking base 150. As shown, the locking base 150 includes an annular shaped body 151 having a threaded outer surface 152 for engaging the threads of the collar 160 and an inner surface 153 having an inner diameter that defines an opening 154 that is configured to receive the torsion bar 140 therein. The opening 154 may have a key-way shape that is configured to receive a portion of the torsion bar 140 having a mating key-way shape in order to transmit torque between the locking base 150 and the torsion bar 140.

The locking base 150 may also include a shoulder 156 that extends outwardly from the outer surface 152, such as in a direction that is transverse to the axis of rotation 119. The shoulder 156 may be configured to retain the energy management device 170 between the shoulder 156 of the locking base 150 and the spool 130, such as the shoulder 136 of the spool 130. For example, the shoulder 156 and the body 151 of the locking base 150 in combination with the shoulder 136 of the spool 130 may form the cavity in which the energy management device 170 is provided and retained therein. As shown, the shoulder 156 has a generally L-shaped cross-section, but the shoulder may be annular in shape or have any suitable shape that is able to retain the energy management device 170 in place.

As shown in FIGS. 4 and 5, the energy management device 170 is disposed between the spool 130 and the locking base 150 in the cavity formed therebetween. According to an exemplary embodiment, the energy management device 170 includes a frusto-conical shaped spring 171 (e.g., a Belleville spring or washer), having an inner diameter that defines an opening 172 that is configured to receive the body 151 of the locking base 150 therein and an outer diameter 173 that is configured to be retained by the spool 130, such as the first end 131 and/or the shoulder 136. The energy management device 170 (e.g., the spring 171) may be configured to impart a force when compressed. For example, when the cavity is reduced in size (e.g., the width as shown in FIG. 5), such as from relative movement between the locking base 150 and the spool 130, the spool 130 (e.g., the first end 131) and the locking base 150 (e.g., the shoulder 156) may compress the energy management device 170 causing it to exert a force (e.g., separation force) onto both the spool 130 and the locking base 150. This force may, for example, be in a direction that is generally parallel to the axis of rotation 119 to in turn generate a friction force between the energy management device 170 and the spool 130 and/or the locking base 150. These forces may also be varied (e.g., increased) upon further compression of the energy management device 170 to thereby provide a progressive level of load resistance or energy absorption.

When the locking base 150 is locked from rotation, such as during a vehicle dynamic impact event, the spool 130 may rotate under occupant loading when the loading overcomes the torsion strength of the torsion bar 140. Upon rotation of the spool 130 relative to the locking base 150, the locking base 150 is moved (e.g., slides, displaces) along the axis of rotation 119 of the spool 130 such that the shoulder 156 of the locking base 150 moves toward the spool 130, such as the first end 131, thereby compressing the spring 171 between the locking base 150 and spool 130. The locking base 150 is able to move toward the spool 130 upon relative rotation between the spool 130 and locking base 150 because of the threaded connection or coupling between the locking base 150 and the collar 160. As the collar 160 rotates with the spool 130 relative to the locking base 150 the threads cause the locking base 150 to move (e.g., slide, displace) relative to the collar 160, where the distance that the locking base 150 moves relative to the spool 130 is a function of the thread pitch. Accordingly, the thread pitch of the threaded connection between the locking base 150 and collar 160 may be varied to tailor the displacement (e.g., the rate of displacement) of the locking base 150 relative to the spool 130 as a function of the rotation of the spool 130 relative to the locking base 150.

Moreover, additional compression of the energy management device 170 (e.g., the spring 171) changes (e.g., increases) the force applied by the energy management device 170 onto the spool 130 (and/or the locking base 150) to thereby influence (e.g., increase) the torque that is required to induce additional rotation of the spool 130 relative to the locking base 150. Accordingly, the energy management device 170 is configured to alter the torque curve characteristics of the retractor (i.e., the level of torque the retractor can absorb) upon rotation of the spool 130 relative to the locking base 150. For example, the torque curve characteristic of the retractor may be progressive, such that the amount of energy required to further rotate the spool 130 relative to the locking base 150 is increased as a function of the relative rotation between the spool 130 and locking base 150. Accordingly, the retractor 20 is configured to provide a progressive amount of energy management.

In addition, the energy management device 170 may be configured to alter the torque curve characteristics of the retractor 20 from the initial relative rotation between the spool 130 and the locking base 150 by having a preset force imparted by the energy management device into the spool 130, such as by having a preset level of compression on the energy management device 170 between the spool 130 and locking base 150. In other words, the retractor 20 with the energy management device 170 may be configured without a threshold force, such that the retractor begins to absorb energy through the energy management device as soon as the retractor undergoes loading. This threshold force may be achieved, for example, by having the energy management device 170 initially configured under a predetermined amount of compression. In other words, the retractor 20 may be assembled with the energy management device 170 in a first compressed state that produces an initial threshold force.

Alternatively, the energy management device 170 may be configured to alter the torque curve characteristics of the retractor 20 after some predetermined amount of relative rotation between the spool 130 and the locking base 150. This may be achieved, for example, by having a predetermined or preset amount of clearance between the energy management device 170 and the spool 130 and/or locking base 150, such that the energy management device 170 is not initially in compression. The energy management device 170 is then placed into compression upon some level of rotation of the spool 130 (e.g., one-half turn, one turn, ten turns, etc.) relative to the locking base 150, where upon additional rotation of the spool 130 relative to the locking base 150 after the preset clearance has been removed increases the force exerted from the energy management device 170. The force imparted by the energy management device 170 into the spool 130 and/or the locking base 150 may then be increased with successive relative rotation to thereby increase the torque required to continue rotating the spool 130 relative to the locking base 150.

Figure 6:
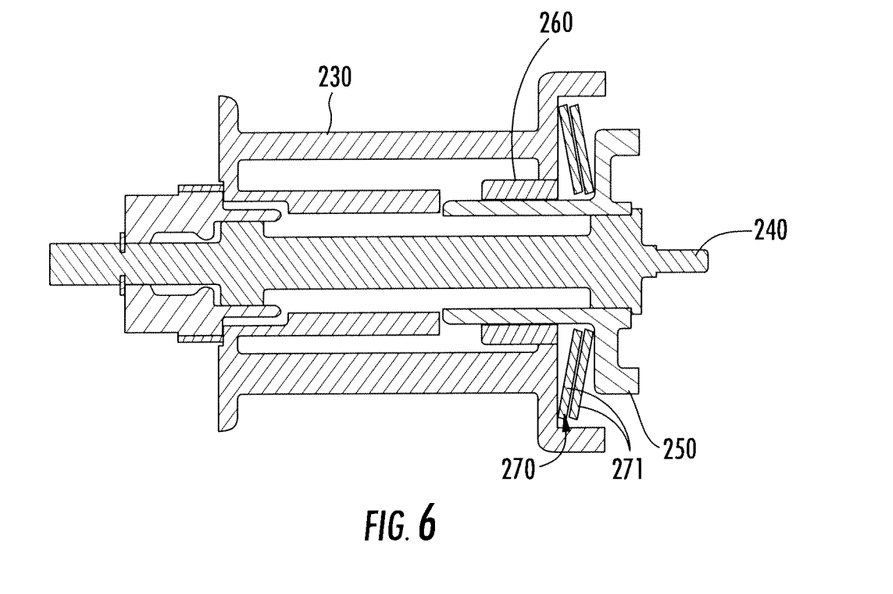
FIG. 6 is a partial cross-sectional view of another exemplary embodiment of a spool assembly for a retractor.
Figure 11:
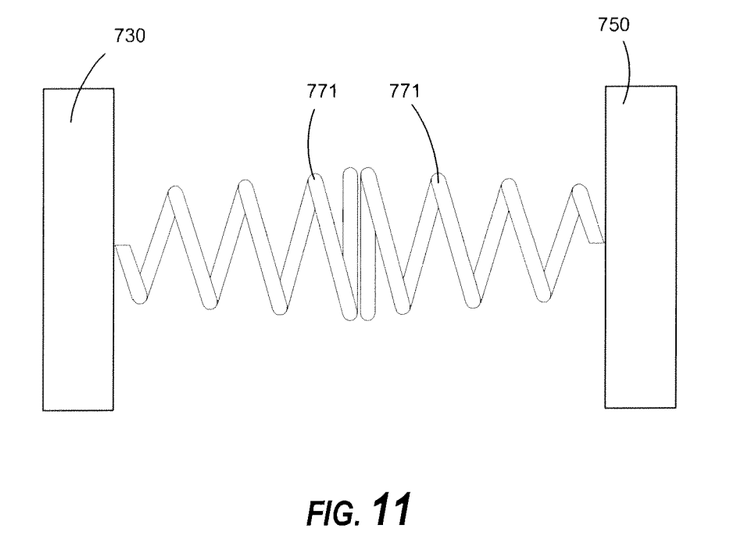
FIG. 11 is a schematic drawing of an exemplary embodiment of a spool assembly having a plurality of energy management devices configured in series.

The energy management device of the retractor may be configured to include more than one element or component (e.g., the spring 171). For example, the energy management device 270 of the retractor may include two (or more) springs 271 (e.g., Belleville springs) disposed adjacent to one another in the direction of compression/tension (e.g., stacked, in series), as shown in FIG. 6. The two (or more) stacked springs 271 may be similarly configured (e.g., have similar spring rates, similar sizes, similar shapes, etc.), such that two springs 271 disposed between the spool 230 and the locking base 250 having a front-to-back configuration can produce twice the displacement (e.g., movement length) when subjected to the same load (e.g., compression) as the single spring configuration. In other words, the two spring 271 stacked configuration will allow the locking base 250 to move (e.g., displace) toward the spool 230, such as relative to the spool 230 and/or the shaft 340, with twice the displacement relative to the single spring configuration when operating under similar loading. FIG. 11 illustrates another example of an energy management device having two springs 771 configured in series between the spool 730 and the locking base 750.

Figure 12:
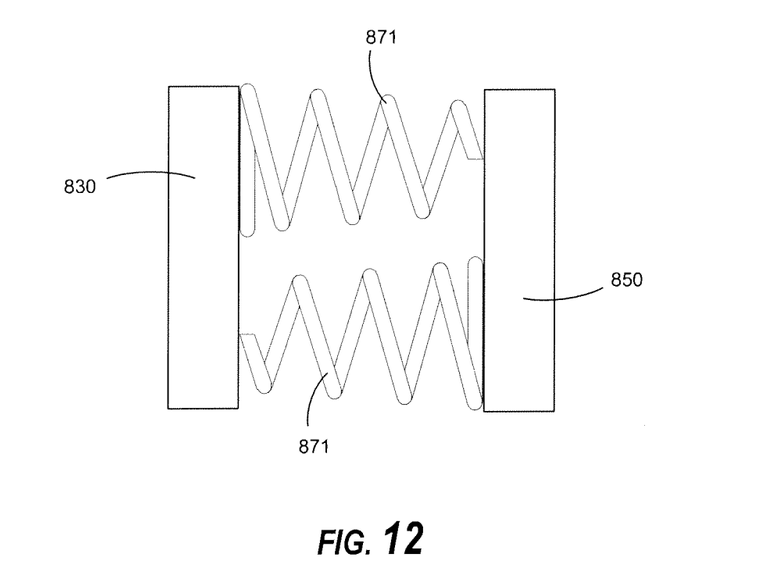
FIG. 12 is a schematic drawing of an exemplary embodiment of a spool assembly having a plurality of energy management devices configured in parallel.

As another example, the energy management device of the retractor may include two (or more) springs (e.g., Belleville springs) disposed adjacent to one another in a direction transverse to the direction of compression/tension (e.g., in parallel). The two (or more) springs configured in parallel may be similarly or dissimilarly configured, such that two similarly configured springs disposed between the spool and the locking base having a side-by-side configuration require twice the load or torque to displace the same distance relative to a single spring configuration, such as to compress the energy management device the same distance that the locking base (e.g., the shoulder) moves toward the spool when induced by relative rotation between the spool and the locking base. FIG. 12 illustrates an example of an energy management device having two springs 871 configured in parallel between the spool 830 and the locking base 850. The two (or more) springs may also have dissimilar spring rates, to further influence the torque curve characteristics of the retractor. Accordingly, the desired displacement-to-load (e.g., force) ratio of the energy management device may be tailored by varying the number and/or characteristics (e.g., spring rate) of the springs of the energy management device to thereby tailor the torque curve characteristics of the retractor.

The torsion bar 140 is configured to transmit torque to absorb energy. As shown in FIG. 5, the torsion bar 140 includes a shaft 143, a first gear 141 extending from the shaft 143 at a first location, and a second gear 142 extending from the shaft 143 at a second location. The first and second locations may be at any suitable position along the shaft 143. The gears 141, 142 are configured to transmit the torque. For example, the gears 141, 142 may be configured as spur gears, as key-way shaped gears, or may be configured having any suitable configuration that is able to transmit torque.

The retractor having the torsion bar 140 may also include a pinion 180 and a spool bearing 191. As shown, the pinion 180 is disposed on the second end 132 of the spool 130, and the spool bearing 191 is provided around a portion of the pinion 180 to facilitate efficient relative rotation between the spool assembly and another component (e.g., the frame) of the retractor (e.g., the retractor 20). The pinion 180 and spool bearing 191 may provide for selective efficient rotation of the spool 130, pinion, and spool 130 bearing relative to another component of the retractor, such as a frame, which may support the spool 130 and couples the retractor to a seat or other vehicle component. According to an exemplary embodiment, the pinion 180 may be formed separately from the spool 130 and coupled thereto using any suitable process (e.g., welding, press-fit, etc.). According to another exemplary embodiment, the pinion 180 may be integrally formed with the spool 130, such that it is a unitary component. For example, the pinion 180 may be formed with the spool 130 (e.g., at the second end 132) from the same material. Furthermore, the other examples shown having pinions may have the pinion integrally formed with the spool or formed separately then coupled thereto.

The pinion 180 may have an annular body 181 with a shoulder 182 extending away from the body 181. The shoulder 182 may be configured to engage the spool 130 through a second opening 137, such as to align a central axis of the pinion 180 with the axis of rotation 119. The pinion 180 may include a bore 183 that is configured to receive the torsion bar 140 therein. As shown in FIG. 5, the bore 183 includes a first portion 183a and a second portion 183b. The first portion 183a may be configured to receive a portion of the shaft 143 of the torsion bar 140, and the second portion 183b may be configured to receive the first gear 141 of the torsion bar 140 to thereby transmit torque between the torsion bar 140 and the pinion 180. However, it is noted that the first gear 141 may be configured to transmit torque directly or indirectly (e.g., through another component) to the spool. Accordingly, the second portion 183b of the bore 183 may have a shape (e.g., key-way, spur gear, etc.) that receives and engages the first gear 141, which has a mating key-way, to prevent relative rotation between the pinion 180 and the torsion bar 140.

The spool bearing 191 may be annular shaped and may be configured to be provided around a section of the pinion 180, such as around a section of the outer surface of the pinion 180. An outer surface of the spool bearing 191 may be configured to engage another component of the retractor, such as the frame, to allow for rotation of the spool assembly relative to the other retractor component. It is noted that the spool bearing 191 may have any suitable configuration (e.g., shape, size, etc.) that may allow for efficient rotation of the spool assembly relative to another retractor component.

The retractor 20 may also include a retaining member configured to prohibit the torsion bar 140 from sliding along its longitudinal axis (e.g., the axis of rotation 119) relative to the spool bearing 191 and spool 130. As shown in FIG. 4, the retaining member is in the form of an E-clip 193 that engages the shaft 143 of the torsion bar 140. For example, the E-clip 193 may be configured to engage an undercut recess provided in the shaft 143 to retain the torsion bar 140 in place relative to the spool bearing 191 and spool 130. The retaining member may also be configured to engage another section of the torsion bar 140, such as a shoulder, to retain the torsion bar 140 in place relative to the spool bearing 191 and spool 130.

The spool assembly of FIGS. 4 and 5 may be configured without the torsion bar 140, such that the retractor includes the spool 130, the collar 160, the locking base 150, and the energy management device 170, each of which may be configured generally as described above, but may be modified to reflect the lack of a torsion bar 140 passing through the spool 130, the collar 160, and/or the locking base 150. The spool assembly configured without the torsion bar 140 still provides energy management through absorbing loading (e.g., torque) during relative rotation between the spool 130 and the locking base 150, however, may provide a different torque curve characteristic for the retractor having the spool assembly, since the torsion bar 140 is not a factor into the torque curve characteristic.

Figure 7:
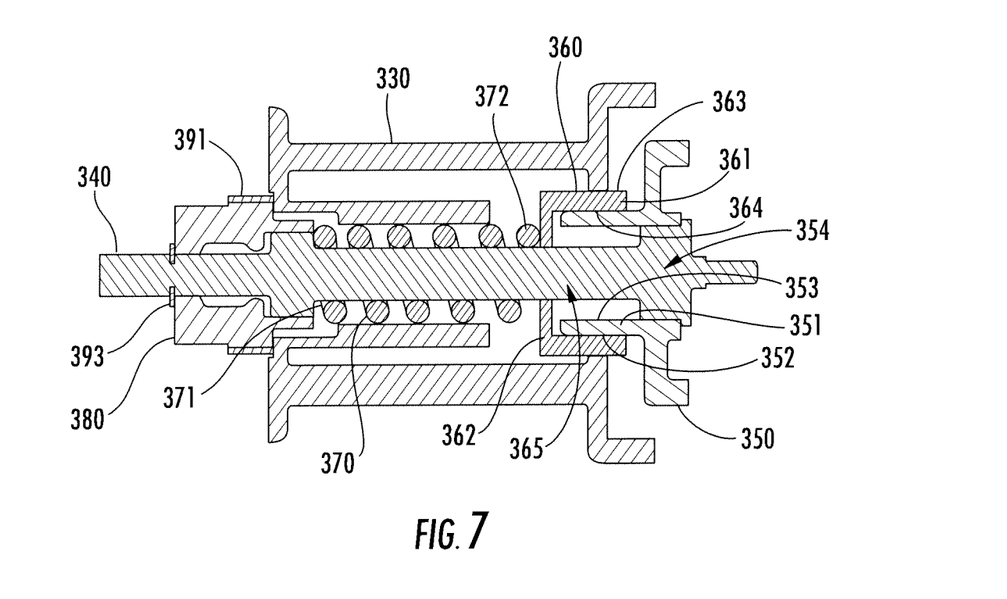
FIG. 7 is a cross-sectional view of a spool assembly for a seatbelt retractor having an energy management device, according to another exemplary embodiment.

FIG. 7 illustrates another exemplary embodiment of a spool assembly for use in a retractor that includes a spool 330, a torsion bar 340, a locking base 350, a movable member 360 (e.g., a spring stop member), and an energy management device in the form of a helical compression spring 370. The spool 330 may be generally configured as described above, and may include a pinion 380 integrally formed therewith or coupled thereto. The spool assembly of FIG. 7 may also include a spool bearing 391 and a retaining member 393, as described above.

As shown, the movable member 360 has generally a C-shaped cross-section that includes an annular base 361 (e.g., ring section) and a wall 362 extending between a section of the base 361, such as at or near an end of the base 361. The base 361 includes an outer surface 363 and an inner surface 364. The outer surface 363 is configured to engage the spool 330 to be contained therein, such that the movable member 360 rotates with the spool 330 a corresponding amount when the spool 330 rotates, while allowing for the movable member 360 to move along the axis of rotation relative to the spool 330. In other words, the movable member 360 and the spool 330 may be configured to rotate together, yet the movable member 360 may slide axially relative to the spool 330. For example, the inner surface 364 may include threads that are configured to receive mating threads of the locking base 350 to allow relative adjustment (e.g., movement along a pivot axis of the movable member or the axis of rotation) between the movable member 360 and the locking base 350. For the spool assembly arranged having the torsion bar 340, the wall 362 of the movable member 360 may include an opening 365 that is configured to allow the torsion bar 340 to pass therethrough. The wall 362 is configured to support and/or receive the energy management device (e.g., the spring 370), and may have a feature (e.g., recess, bore, protrusion, shoulder, etc.) that aids in the retention of the energy management device (e.g., the spring 370), such as retaining an end of the spring.

The locking base 350 is generally configured, as described above, with an annular shaped body 351 having a threaded outer surface 352 configured to engage the threads of the movable member 360 in a threaded connection and an inner surface 353 that defines an opening 354 that is configured to receive the torsion bar 340. The locking base 350 is configured to be selectively locked (i.e., prevented from rotating) by an actuator (not shown), such as to prevent the rotation of the locking base 350 relative to the frame during a dynamic vehicle event.

As shown, the compression spring 370 has a helical or coiled shape. The helical compression spring 370 has an inner diameter that is configured to receive the torsion bar 340, such that the spring 370 is disposed (e.g., wrapped) around the torsion bar 340. The spring 370 also has an outer diameter that is configured to fit within a cavity (e.g., bore, opening, etc.) of the spool 330. It is noted that the spring 370 may be configured having different configurations (e.g., size, length, diameter, material, etc.), such as to vary the performance characteristics (e.g., spring rate) of the spring 370 to tailor the performance of the retractor and spring. For example, the spring 370 may have a constant rate or variable rate having a standard, variable pitch-variable rate, barrel, hourglass, conical, or any other suitable shape or configuration. The spring 370 includes a first end 371 and a second end 372, where the first end 371 may be retained by, for example, a shoulder on the torsion bar 340 and/or an end of the spool 330, and where the second end 372 may be retained by the wall 362 of the movable member 360. As shown in FIG. 7, the shoulder of the torsion bar 340 that retains or limits movement of the first end 371 of the spring 370 may also be a gear that is configured to transmit torque between the torsion bar 340 and the pinion 380 (and/or the spool 330). Alternatively, the energy management device may be configured differently than the spring 370, and still provide a force into the spool 330 that resists rotation of the spool 330 when locked, where the force is induced by relative movement (e.g., displacement) between the movable member 360 and the spool 330.

When the locking base 350 is selectively locked (i.e., prevented from rotating), such as during a dynamic vehicle event, the spool 330 may rotate relative to the locking base 350 by overcoming the resistance from the energy management device 370 (and torsion bar 340 if provided), such as induced by occupant loading through the seatbelt. Relative rotation between the spool 330 and locking base 350 causes the movable member 360 to move (e.g., displace), such as along the axis of rotation relative to the spool 330 in a direction toward the spring 370. Thus, the movement of the movable member 360 compresses the spring 370 thereby increasing the force imparted by the spring 370 onto the movable member 360 (and the spool 330, pinion 380, and/or the torsion bar 340) to influence the torque required to continue rotating the spool 330 relative to the locking base 350. For example, the movable member 360 may move axially toward the end of the spool 330 opposing the locking base 350 to compress the energy management device (e.g., the spring 370) disposed in the spool 330 against the torsion bar 340, such as the shoulder (e.g., gear).

Alternatively, relative rotation between the locking base 350 and the spool 330 may be configured to move the locking base 350 to compress the energy management device (e.g., the spring 370). For example, the wall 362 may be integrally formed with or connected to the locking base 350, which may move together relative to the base 361 and the spool 330. The compression of the energy management device may impart a force to the spool 330 that resists additional rotation of the spool 330 relative to the locking base 350, such that continued rotation of the spool 330 is achieved by an increase in torque sufficient to overcome the opposing force from the energy management device.

Figure 8:
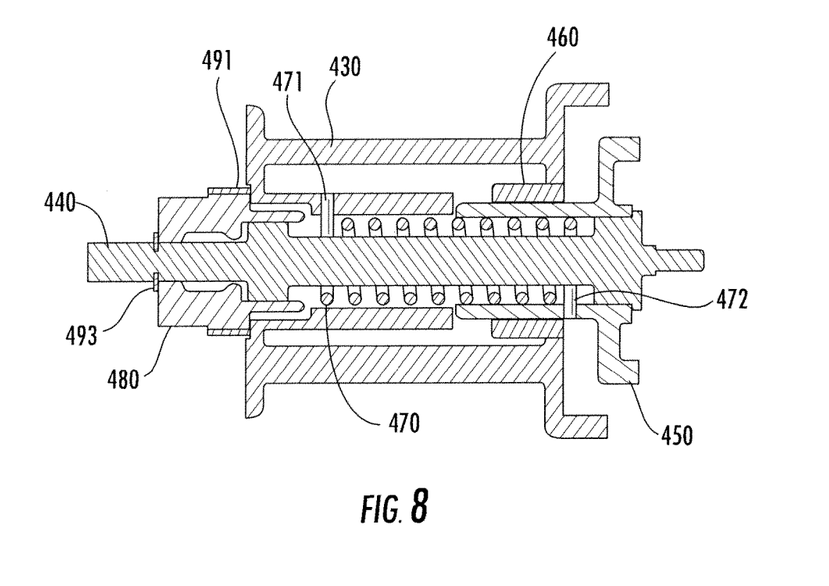
FIG. 8 is a cross-sectional view of a spool assembly for a seatbelt retractor having an energy management device, according to another exemplary embodiment.

FIG. 8 illustrates yet another exemplary embodiment of a spool assembly for a retractor (e.g., the retractor 20) that includes a spool 430, a shaft 440, a locking base 450, a collar 460, and an energy management device in the form of a torsion spring 470. The spool assembly may also include any element discussed above, such as, for example, a pinion 480, a spool bearing 491, and/or a retaining member 493, which may be configured as described above. The spool 430, the collar 460, and the locking base 450 may be generally configured as described above. However, the collar 460 and the locking base 450 may be configured without a threaded engagement. Further, the shaft 440 may be configured as a torsion bar, which may be generally configured as described above, such as for the torsion bar 140, to thereby absorb energy during relative rotation between the spool 430 and the locking base 450.

As shown, the energy management device is configured as a torsion spring 470 having a helical or coiled shape with a first tang 471 (e.g., end) that is configured to engage the spool 430 and a second tang 472 (e.g., end) that is configured to engage the locking base 450. The body of the torsion spring 470 may be configured to wrap around the shaft 440, such as where the body of the spring 470 and the shaft 440 are provided in a cavity (e.g., a bore, an opening, etc.) of the spool 430. Relative rotation between the spool 430 and the locking base 450 is configured to wind the spring 470 to change (e.g., increase) the torque that is required to continue to wind the spring 470 and continue to rotate the spool 430 relative to the locking base 450. Thus, when the locking base 450 is in a locked mode of operation to prohibit its rotation, the torsion spring 470 absorbs energy as the spring is wound by the rotation of the spool 130 relative to the locking base 150. The torsion spring 470 may influence the torque curve characteristics of the retractor by, for example, inducing friction between the coils and the shaft and/or having an increasing torque due to the spring rate of the spring.

The spool 430 includes a feature that is configured to retain the first tang 471 of the spring 470. For example, the spool 430 may include a tab, a notch, a recess, or any other suitable feature that retains the first tang 471. Additionally, the locking base 450 includes a feature that is configured to retain the second tang 472 of the spring 470. For example, the locking base 450 may include a tab, a notch, a recess, or any suitable feature that retains the second tang 472. The spring 470 may be configured to lock out on the shaft 440 after a preset rotation (e.g., between the first and second tangs 471, 472). For example, the spring 470 may be configured to have an inner diameter having a predetermined amount of clearance with an outer diameter of the shaft 440, and that during relative rotation between the first and second tangs 471, 472 the clearance is reduced until after the preset rotation the inner diameter of the spring 470 comes into contact with the outer diameter of the shaft 440. This contact may advantageously induce friction to further tailor the load and energy absorption (e.g., the torque curve characteristics) of the spool assembly and retractor. The spring 470 may also be configured to go solid after a preset rotation (which may be similar or different than the preset rotation to lock out the spring), such as where two or more adjacent coils of the spring come into contact. For example, there may be a predetermined gap (e.g., clearance) provided between adjacent coils of the spring 470, and this gap may be reduced, such as during winding of the spring (e.g., relative rotation between the first and second tangs 471, 472). Accordingly, the size of the gap may be tailored to the rotation (e.g., the desired angle of rotation), such that after the rotation, the gap is eliminated to bring the adjacent coils into contact due to the compressing of the spring along its longitudinal axis. The spring going solid may advantageously alter the load and energy absorption (e.g., the torque curve characteristics) of the spool assembly and retractor. The number of coils that go solid may be tailored to thereby tailor the performance of the energy absorption of the retractor.

Figure 9:
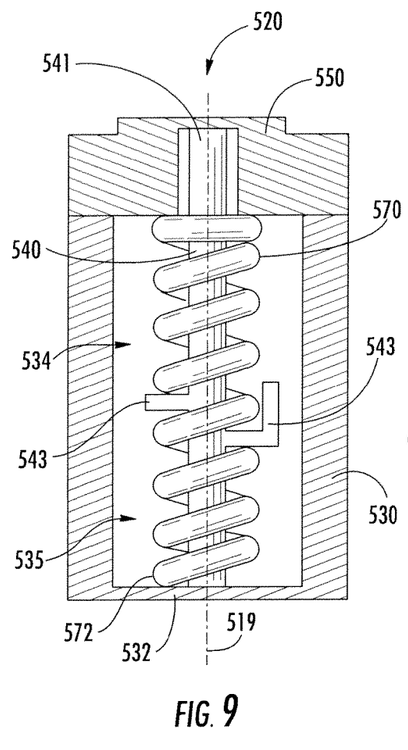
FIG. 9 is a cross-sectional view of a spool assembly for a seatbelt retractor having an energy management device, according to another exemplary embodiment.
Figure 10:
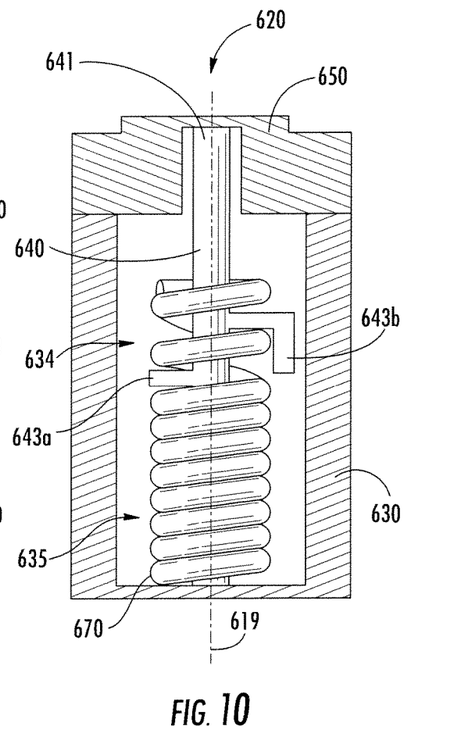
FIG. 10 is a cross-sectional view of a spool assembly for a seatbelt retractor having an energy management device, according to yet another exemplary embodiment.

FIGS. 9 and 10 illustrate yet other exemplary embodiments of spool assemblies for retractors having energy management devices configured to absorb energy to influence the torque curve characteristic of the retractors. Each retractor (e.g., spool assembly) includes a spool, a locking base, a shaft disposed within the spool, and a spring disposed around the shaft.

As shown in FIG. 9, the retractor 520 includes a spool 530, a locking base 550, a shaft 540, and a spring 570. The spool 530 includes a bore provided in a side, and the locking base 550 is provided on the side of the spool having the bore. The shaft 540 and the spring 570 are disposed in the bore of the spool 530. The shaft 540 includes a first end 541 coupled to the locking base 550 and also includes at least one arm 543 extending from the shaft 540. Each arm 543 is configured to engage the spring 570 (shown in the form of a helical compression spring), where each arm 543 is able to move the spring 570 along a longitudinal axis 519 (e.g., of the shaft 540), such as, for example, to change a number of coils of the spring 570 that are provided between the arm 543 and the spool 530 (and/or the locking base 550). The spring 570 may be coupled to the spool 530 in order for the spring 570 and spool 530 to rotate together. For example a second end 572 of the spring 570 may be coupled to a wall 532 of the spool 530.

When the locking base 550 is selectively locked, such as during a dynamic vehicle event, the spool 530 is able to rotate relative to the locking base 550 upon overcoming the resistance force of the energy management device (e.g., the spring 570). Furthermore, when the spool 530 and spring 570 rotate about the longitudinal axis 519 relative to the locked locking base 550 and the arms 543 of the shaft 540, such as from loading of the webbing 12 by an occupant, the spring 570 is moved along the longitudinal axis 519 thereby shifting a number of coils of the spring 570 from a first side 534 (e.g., free side) to a second side 535 (e.g., fixed side). For example, movement of the spring 570 may increase the number of coils of the spring 570 on the second side 535 of the spring 570 to thereby compress the spring 570. Compression of the spring 570 may increase the resistance force imparted from the spring 570 onto the spool 530 to change the energy absorbing performance of the retractor 520.

Additionally, depending on the normal force between the shaft 540 and the spring 570, the above described arrangement (e.g., the arrangement of FIG. 9) may allow the energy management device to be reset. As the webbing 12 is extracted (e.g., removed, pulled) from the spool 530, the spring 570 resists the shaft 540 moving the coils to the second side 535 of the spool assembly to thereby absorb energy (e.g., load), which may provide a second tensioning effect on the webbing 12 to remove slack from the seatbelt system (e.g., the webbing).

As shown in FIG. 10, the retractor 620 includes a spool 630, a locking base 650, a shaft 640, and a spring 670. The spool 630 includes a bore provided in a side, and the locking base 650 is provided on the side of the spool having the bore. The shaft 640 and the spring 670 are disposed in the bore of the spool 630. The spring 670 is in the form of a helical extension spring in place of the helical compression spring 570. The extension spring 670 may have a constant or variable spring rate, and may have a body that wraps around the shaft 640. The extension spring 670 may be coupled to the spool 630. For example, the spring 670 may include an end configured to be fixed to at least at a portion of the spool 630, such as a wall. The shaft 640 includes a first end 641 coupled to a locking base 650 and at least one arm 643 extending from the shaft 640. As shown, the shaft 640 includes a first arm 643a that has a generally linear shape and a second aim 643b that has a generally L-shape, where the arms 643a, 643b are configured to move the spring 670 upon relative rotation.

When the locking base 650 is selectively locked, such as during a dynamic vehicle event, the spool 630 is able to rotate relative to the locking base 650 upon overcoming the resistance force of the energy management device (e.g., the spring 670). Furthermore, when the spool 630 and spring 670 rotate about the longitudinal axis 619 relative to the locking base 650, the spring 670 is configured to move along the longitudinal axis 619 thereby causing the arms 643 to shift a number of coils of the spring 670 from a first side 634 (e.g., a fixed side) to a second side 635 (e.g., a free side). For example, movement of the spring 670 may decrease the number of coils of the spring 670 on a side (e.g., the fixed side) of the spring 570 to thereby extend the length of the spring 670 to influence (e.g., increase) the resistance force of the spring 670. Additionally, depending on the normal force between the shaft and the spring, this arrangement may allow the energy management device to be reset. As webbing is extracted (e.g., removed, pulled) from the spool, the spring resists the shaft moving the coils to the free side of the spring to thereby absorb energy (e.g., load), which may provide a second tensioning effect on the webbing to remove slack from the seatbelt system (e.g., the webbing).

Figure 13:
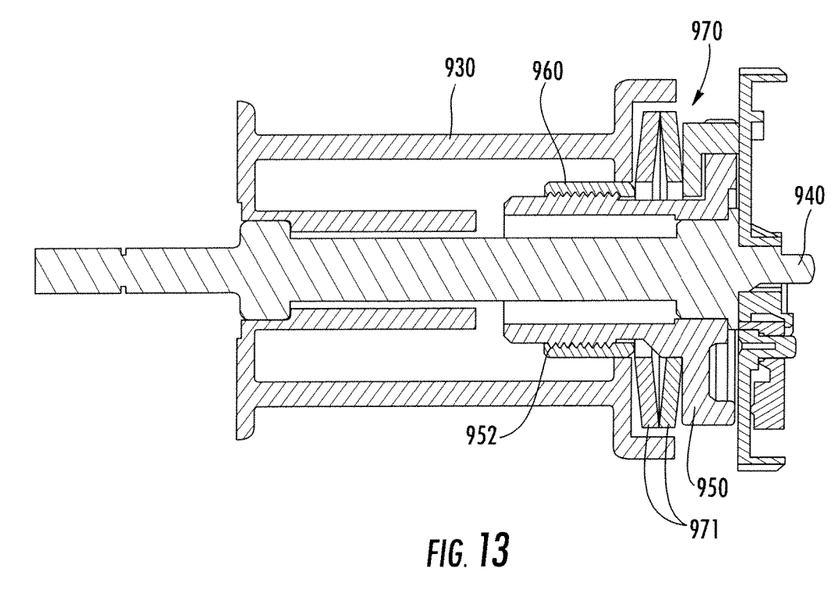
FIG. 13 is a cross-sectional view of a spool assembly for a seatbelt retractor having an energy management device, according to yet another exemplary embodiment.
Figure 14:
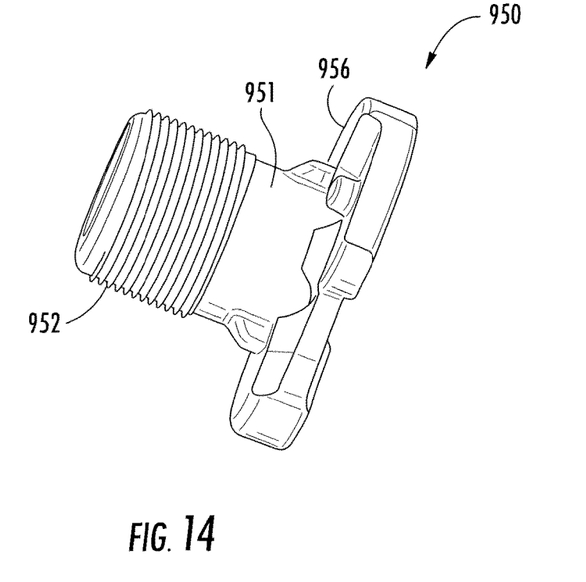
FIGS. 14 and 15 are perspective views of an exemplary embodiment of a locking base for use in a spool assembly of a retractor, such as the spool assembly of FIG. 13.
Figure 15:
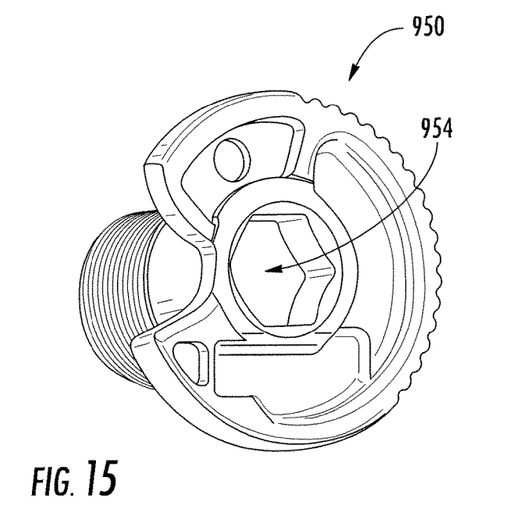

FIGS. 13-15 illustrate yet another exemplary embodiment of a spool assembly for use in a retractor to provide a tailored (e.g., progressive) load and energy absorbing characteristic of the retractor. The spool assembly includes a spool 930, a torsion bar 940 disposed within a cavity (e.g., opening) of the spool 930, a locking base 950, a collar 960 provided between the spool 930 and the locking base 950, and an energy management device 970 (e.g., an energy absorbing member, a load carrying member, etc.) disposed between the locking base 950 and the spool 930. The spool 930 is configured to be operatively coupled to an end of the seatbelt webbing 12. The torsion bar 940 is configured to absorb energy. The locking base 150 is configured to selectively lock the spool assembly to resist rotation of the spool 930.

As shown in FIG. 13, the energy management device 170 includes two springs 971 disposed in series (e.g., a series stacked arrangement). For example, the two springs 971 may be similarly configured and provided in symmetrically opposite arrangement. However, the energy management device 170 may include more than two springs 971, where each spring may be configured differently or similarly relative to the other springs.

Also shown in FIG. 13, the collar 960 and locking base 950 are connected by a threaded connection, such that relative rotation between the collar 960 and the locking base 950 may move, for example, the locking base 950 along its longitudinal axis (e.g., which may correspond to the axis of rotation of the spool assembly) in a direction toward the spool 930 to thereby compress the two (or more) springs 971 disposed between the locking base 950 and the spool 930. This compression may induce forces, as disclosed above, which may resist rotation of the spool 930 when the retractor is in a locked mode of operation. The resistance of the springs 971 may provide a progressive torque curve characteristic of the retractor.

As shown in FIGS. 14 and 15, the locking base 950 includes a body 951 having a threaded portion 952, which is configured to engage the collar 960 to drive, for example, relative axial movement between the locking base 950 and collar 960 upon relative rotation therebetween. The locking base 950 also includes a shoulder 956 that extends from the body 951. The shoulder 956 may be configured to help retain the springs 971 in place, and may further include a feature that is configured to lock rotation of the locking base 950. For example, the shoulder 956 may include gear teeth disposed along at least a portion of the outer periphery, where the gear teeth are configured to receive mating teeth from a locking pawl to prevent rotation of the locking base 950. However, the shoulder 956 may include other features to prevent rotation of the locking base 950, such as a surface (e.g., cam) or notch that is configured to receive a mating portion of another element, such as a locking pawl.

The locking base 950 may also include an opening 954 configured to receive a portion of the torsion bar 940. As shown in FIG. 15, the opening 954 may be hexagonal and configured to receive a hexagonal shaped portion of the torsion bar 940 to transmit torque between the locking base 950 and the torsion bar 940. However, the opening 954 may have other suitable shapes (e.g., polygonal, spline, etc.) that transmit torque.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the retractors and/or spool assemblies as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A refractor assembly for a seatbelt system having a webbing for restraining a secured occupant, the retractor comprising:
   a spool configured to wind and unwind the webbing about an axis of rotation, the spool includes a side with an opening therein;
   a collar including an outer surface and an inner surface, the outer surface configured to engage the opening;
   a locking base configured to operatively engage the inner surface; and
   an energy absorbing member configured to provide a progressive level of load resistance via compression of the energy absorbing member in a direction parallel to the axis of rotation upon relative rotation between the spool and the locking base.

2. The retractor assembly of claim 1, wherein the energy absorbing member is disposed between the locking base and the spool and configured to provide the progressive level of load resistance upon compression by the locking base and the spool; and wherein relative rotation between the spool and the locking base drives movement of the locking base relative to the spool in the direction parallel to the axis of rotation to compress the energy absorbing member.

3. The retractor assembly of claim 2, wherein the locking base includes a body and a shoulder, the body configured to operatively engage the inner surface of the collar and the shoulder configured to retain the energy absorbing member.

4. The retractor assembly of claim 3, wherein the spool also includes a shoulder extending from the side, wherein the shoulder of the spool, the side, the shoulder of the locking base, and the body together form a cavity for the energy absorbing member to be retained therein.

5. The retractor assembly of claim 3, wherein the body includes an outer surface configured to operatively engage the inner surface of the collar through a threaded connection.

6. The retractor assembly of claim 5, wherein the outer surface of the collar includes at least one lug configured to engage a portion of the opening in the side of the spool to prevent relative rotation between the spool and the collar.

7. The retractor assembly of claim 1, further comprising a shaft disposed in the opening of the spool and an opening in the locking base, wherein the energy absorbing member is disposed around the shaft in the opening of the spool and the opening in the locking base, and includes a first end connected to the spool and a second end connected to the locking base, and wherein relative rotation between the spool and the locking base winds the energy absorbing member to provide the progressive level of load resistance.

8. The retractor assembly of claim 7, wherein the progressive level of load resistance is provided by at least one of the spring going solid and the spring locking out on the shaft.

9. The retractor assembly of claim 1, wherein the retractor is operable in a free mode of operation, in which the energy absorbing member is rotatable relative to the locking base, and a locked mode of operation, in which friction between the locking base and the energy absorbing member resists relative rotation therebetween.

10. A retractor assembly for a seatbelt system having a webbing for restraining a secured occupant, the retractor comprising:
    a spool configured to wind and unwind the webbing about an axis of rotation, the spool includes a side with an opening therein;
    a collar including an outer surface and an inner surface, the outer surface configured to engage the opening;
    a locking base including a body that is configured to operatively engage the inner surface; and
    an energy absorbing member configured to provide a progressive level of load resistance upon relative rotation between the spool and the locking base,
    wherein the energy absorbing member is configured as a frusto-conical spring having an opening that is configured to receive the body.

11. The retractor assembly of claim 10, further comprising a torsion bar disposed in the opening of the spool and an opening of the body, the torsion bar having a first gear configured to transmit torque to the spool and a second gear configured to transmit torque to the locking base, wherein the locking base is rotatable about the axis of rotation relative to the energy absorbing member.

12. The retractor assembly of claim 10, wherein the energy absorbing member is provided between a shoulder of the locking base and the spool, such that relative rotation between the locking base and the spool compresses the energy absorbing member between the shoulder and the spool.

13. The retractor assembly of claim 10, wherein the energy absorbing member has a preset level of compression and provides the progressive level of load resistance via additional compression of the energy absorbing member in a direction parallel to the axis of rotation beyond the preset level of compression.

14. A refractor assembly for a seatbelt system having a webbing for restraining a secured occupant, the retractor comprising:
- a spool configured to wind and unwind the webbing about an axis of rotation, the spool includes a side with an opening therein;
- an energy absorbing member disposed in the opening of the spool and configured to provide a progressive level of load resistance upon compression; and
- a locking base;
- wherein relative rotation between the spool and the locking base is configured to compress the energy absorbing member.

15. The retractor assembly of claim 14, further comprising a torsion bar disposed in the opening of the spool and having a first gear configured to transmit torque to the spool and a second gear configured to transmit torque to the locking base.

16. The retractor assembly of claim 15, further comprising a movable member, wherein the energy absorbing member is in the form of a helical compression spring wrapped around the torsion bar, the spring having a first end and a second end configured to contact the movable member, the first end configured to contact one of the first gear, the spool, and a pinion operatively coupled to a second side of the spool.

17. The retractor assembly of claim 16, further comprising a movable member, wherein the movable member includes an outer surface and an inner surface configured to operatively engage the locking base through a threaded connection, the outer surface is configured to prevent relative rotation between the movable member and the spool and to allow relative movement between the movable member and the spool along the axis of rotation, wherein relative rotation between the spool and the locking base moves the movable member through the threaded connection.

18. The retractor assembly of claim 14, further comprising a collar disposed between the spool and the locking base, the collar having an inner surface and an outer surface coupled to the spool, the inner surface configured to operatively engage an outer surface of the locking base through a threaded connection, and wherein there is relative axial movement between the locking base and the collar upon relative rotation between the spool and the locking base.

19. The retractor assembly of claim 14, further comprising a movable member disposed in the opening of the spool, wherein relative rotation between the spool and the locking base is configured to move the movable member along the axis of rotation to compress the energy absorbing member.

* * * * *